United States Patent
Wang et al.

(10) Patent No.: US 8,146,869 B2
(45) Date of Patent: Apr. 3, 2012

(54) BASE STRUCTURE FOR MONITOR

(75) Inventors: Xiao Wang, Fuqing (CN); Lixia Wang, Fuqing (CN); Wen-Hsiung Huang, Fuqing (CN)

(73) Assignee: TPV Electronics (Fujian) Co., Ltd., Fuqing, Fujian Province (CN)

( * ) Notice: Subject to any disclaimer, the term of this patent is extended or adjusted under 35 U.S.C. 154(b) by 49 days.

(21) Appl. No.: 12/607,136

(22) Filed: Oct. 28, 2009

(65) Prior Publication Data

US 2011/0095143 A1    Apr. 28, 2011

(51) Int. Cl.
| A47F 1/10 | (2006.01) |
| A47F 5/00 | (2006.01) |
| A47F 7/00 | (2006.01) |
| A47F 5/12 | (2006.01) |
| F16M 11/00 | (2006.01) |
| F16M 13/00 | (2006.01) |

(52) U.S. Cl. ............. 248/125.2; 248/917; 248/918; 248/919; 248/920; 248/921; 248/922; 248/923; 248/295.11; 248/122.1; 248/423; 248/125.1; 248/125.3; 248/371; 248/133; 40/748; 40/749; 40/755

(58) Field of Classification Search ............ 248/919, 248/918, 125.2, 295.11, 264.06, 917, 920–923, 248/122.1, 125.1–125.3, 121, 371, 407, 408, 248/422–423, 41, 133; 40/748, 749, 755
See application file for complete search history.

(56) References Cited

U.S. PATENT DOCUMENTS

| 6,031,714 | A * | 2/2000 | Ma ............................ 361/679.22 |
| 6,168,124 | B1 * | 1/2001 | Matsuoka et al. ......... 248/176.1 |
| 6,191,940 | B1 * | 2/2001 | Ma ............................ 361/679.23 |
| 6,570,627 | B1 * | 5/2003 | Chang ........................... 348/794 |
| 7,021,600 | B2 * | 4/2006 | Yang ............................. 248/688 |
| 7,249,739 | B2 * | 7/2007 | Chueh et al. .................. 248/133 |
| 7,301,759 | B2 * | 11/2007 | Hsiung .................... 361/679.27 |
| 7,448,588 | B2 * | 11/2008 | Sung ............................. 248/351 |
| 7,478,784 | B2 * | 1/2009 | Wang ............................ 248/161 |
| 7,478,788 | B2 * | 1/2009 | Hsu ............................... 248/371 |
| 7,540,466 | B2 * | 6/2009 | Yang ............................. 248/688 |
| 7,636,133 | B1 * | 12/2009 | Hsu ............................... 348/794 |
| 7,753,336 | B2 * | 7/2010 | Hu ............................... 248/688 |
| 7,864,262 | B2 * | 1/2011 | Chen et al. ...................... 349/58 |
| 2003/0189155 | A1 * | 10/2003 | Serbinski et al. ............. 248/371 |
| 2005/0253040 | A1 * | 11/2005 | Yang ............................. 248/688 |
| 2008/0265109 | A1 * | 10/2008 | Derry et al. ................... 248/149 |
| 2009/0278000 | A1 * | 11/2009 | Hu ............................. 248/122.1 |
| 2010/0012810 | A1 * | 1/2010 | Hu ............................... 248/408 |

* cited by examiner

*Primary Examiner* — Terrell McKinnon
*Assistant Examiner* — Christopher Garft
(74) *Attorney, Agent, or Firm* — Alan Kamrath; Kamrath IP Lawfirm, PA (57) ABSTRACT

A base structure can support a monitor. A fixed portion is firmly disposed on the rear casing of the monitor and contains at least one slide rail. A slide portion can move up and down the slide rail. A spring is linked to the fixed portion and the slide portion. One end of the push bar is pivotally linked to the slide portion. A first stand is firmly disposed on the rear casing. A second stand is pivotally linked to the first stand. Another end of the push bar is pivotally linked to the second stand. In this manner, the monitor may adjust the expanding angle of the second stand so as to place the monitor on the desk or hang the monitor on the wall.

19 Claims, 8 Drawing Sheets

BASE STRUCTURE FOR MONITOR

FIELD OF THE INVENTION

The present invention relates to a base structure for a monitor and, particularly, to the base structure which can adjust its stand so as to place the monitor on the desk or to hang the monitor on the wall.

DESCRIPTION OF THE PRIOR ART

In recent years, due to the lower cost of the flat panel monitor, the monitor has gradually come into vogue in home TV and computer display usages. Besides, because of its thinness and light characteristics comparative to cathode-ray-tube television, the flat panel monitor will be more and more favorable and easily seen in public such as at stations, hospitals, convenient stores or theaters. Flat panel monitors not only can be utilized to deliver messages, but also can achieve some advertising purposes. Thus, the usage and application of flat panel monitors will be wider and wider.

Conventionally, the flat panel monitor has a base structure to support the monitor so as to place the monitor on the desk. However, except for home and office use, most public places need to hang the monitor on the wall. Therefore, additional purchase of a suspending stand for the monitor and abandonment of the original base structure are absolutely required and inevitable. However, it's money-consuming. Moreover, the disassembly of the original base structure and the installation of the purchased suspending stand are time-consuming, resulting in so much inconvenience.

Thus, preventing its inconvenience, incorporating the supporting base structure and the suspending stand into a single monitor, reducing waste of money and disassembling and installing time, and saving a significant amount of resources are virtually a critical issue to be dealt with.

SUMMARY OF THE INVENTION

The primary object of the present invention is to incorporate the supporting base structure and the suspending stand, so as to reduce the waste of money and disassembling and installing time and to save a significant amount of resources.

To achieve the foregoing and other objects, a base structure for a monitor which can be adapted to place the monitor on the desk and to hang the monitor on the wall is provided. The base structure comprises: a rear casing, a fixed portion, a slide portion, at least one spring, a push bar, a first stand and a second stand. Said fixed portion is firmly disposed on said rear casing. Said fixed portion includes at least one first spring connection and at least one slide rail. Said slide portion is repeatedly movable by said slide rail and includes at least one second spring connection. Said spring is linked to said first spring connection and said second spring connection with two ends. Said push bar is pivotally linked to said slide portion with one end of said push bar and repeatedly movable on said rear casing along with said slide portion. Said first stand is firmly disposed on said rear casing. Said second stand is pivotally linked to said first stand with one end of said second stand. Another end of said push bar is pivotally linked to another end of said second stand. Said second stand further contains at least one groove. Thus, said slide portion can be moved up and down, and then, said spring may be stretched, so that the angle between said first stand and said second stand is adjustable and so that the monitor may be placed on the desk or hung on the wall.

In the aforementioned base structure, a lubricating layer is disposed at a contact area between said slide rail and said slide portion. Said lubricating layer is Teflon, a non-woven fabric, or a wear-resisting and low-friction product.

In the aforementioned base structure, said slide portion further contains a thumb screw in order to fasten said slide portion and stop said slide portion from moving. Said thumb screw is matched to an external thread of said slide portion by an internal thread so that the friction between said thumb screw and said rear casing may increase or decrease by fastening or loosening said thumb screw.

In the aforementioned base structure, said slide portion further contains a locking assembly in order to fasten said slide portion and stop said slide portion from moving. Said locking assembly contains at least one hook disposed outside said locking assembly and adjacent to said rear casing. Said rear casing contains at least one notch corresponding to said hook so that said slide portion can stop moving when said hook is stuck by said notch. Said locking assembly further includes at least one grip attaching to the hook and being releasable so as to free said hook from said notch.

In the aforementioned base structure, said first stand contains a plurality of wires passing through the front and rear sides of said first stand and a plurality of sockets correspondingly disposed at the front side and the rear side of said first stand.

In the aforementioned base structure, said fixed portion is disposed on said rear casing by screws.

In the aforementioned base structure, said first spring connection or said second spring connection are hook-shaped so as to make either end of said spring hitch to said first spring connection or said second spring connection.

In the aforementioned base structure, the amount of said spring, said first spring connection or said second spring connection are 2, so that two ends of each spring are linked to one first spring connection and one second spring connection respectively.

In the aforementioned base structure, said first stand and said rear casing are one-body shaped. Said first stand contains a plurality of wires and a plurality of sockets correspondingly disposed at a rear side of said first stand. Said wires are disposed inside said first stand without being exposed.

Therefore, the base structure for a monitor can improve the inconvenience of the prior art by incorporating the supporting base structure and the suspending stand. Thus, there is no need to additionally purchase a suspending stand, and resources as well as time of disassembling the conventional base and installing the purchased stand will be saved. Therefore, the present invention may have tremendous potential in the market.

The foregoing, as well as additional objects, features and advantages of the invention, will be more readily apparent from the following detailed description, which proceeds with reference to the accompanying drawings.

DESCRIPTION OF THE PREFERRED EMBODIMENTS

Figure 1A:
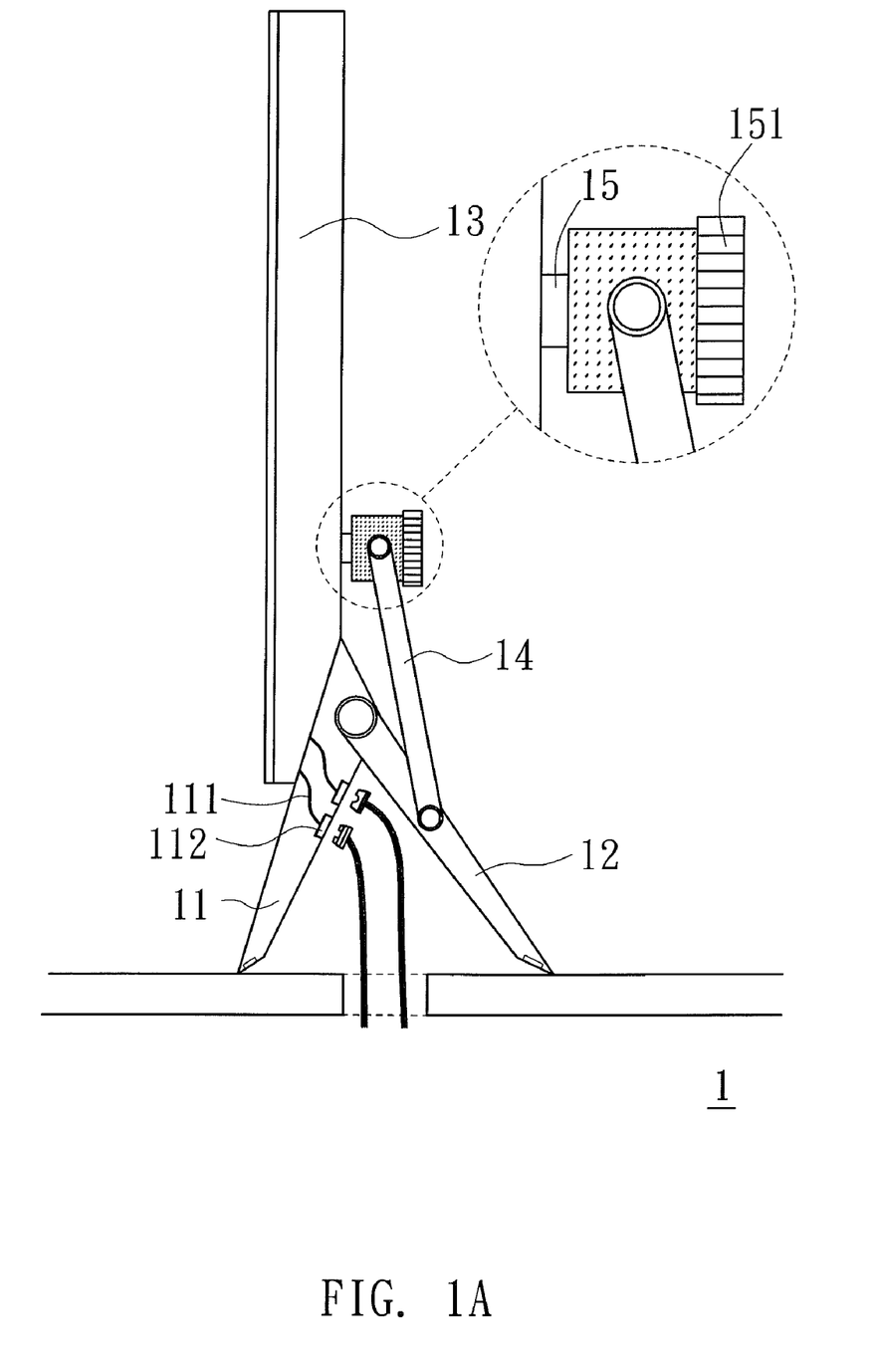
FIG. 1A is a diagram of a monitor with a base structure when the monitor is placed on the desk.

FIG. 1A is a diagram of a monitor with a base structure when the monitor is placed on the desk. As shown in FIG. 1A, the monitor 1 is placed on the desk, and the rear casing 13 includes a push bar 14, a first stand 11, a second stand 12, a slide portion 15 and a thumb screw 151. The slide portion 15 can be repeatedly moved up and down on the rear casing 13. The top end of the push bar 14 is pivotally linked to the slide portion 15 and can be repeatedly moved along with the slide portion 15. The first stand 11 is firmly disposed on the rear casing 13. The left end of the second stand 12 is pivotally linked to the first stand 11. The bottom end of the push bar 14 is pivotally linked to the middle of the second stand 12. The first stand 11 contains a plurality of wires 111 inside and further contains a plurality of sockets 112 correspondingly disposed at a rear side of the first stand 11. The sockets 112 are adapted to receive the signal cable or the power cord. In this embodiment, the rear casing 13 and the first stand 11 are one-body shaped. Thus, the wires 111 can be disposed inside the first stand 11 without being exposed. The sockets 112 are disposed at the rear side of the first stand 11 so that the computer's signal cable or power cord may penetrate the desk to reach the rear side of the first stand 11 and connect to the sockets 112. Therefore, it is impossible for the user to see those messy cables from the front of the monitor 1.

Figure 1B:
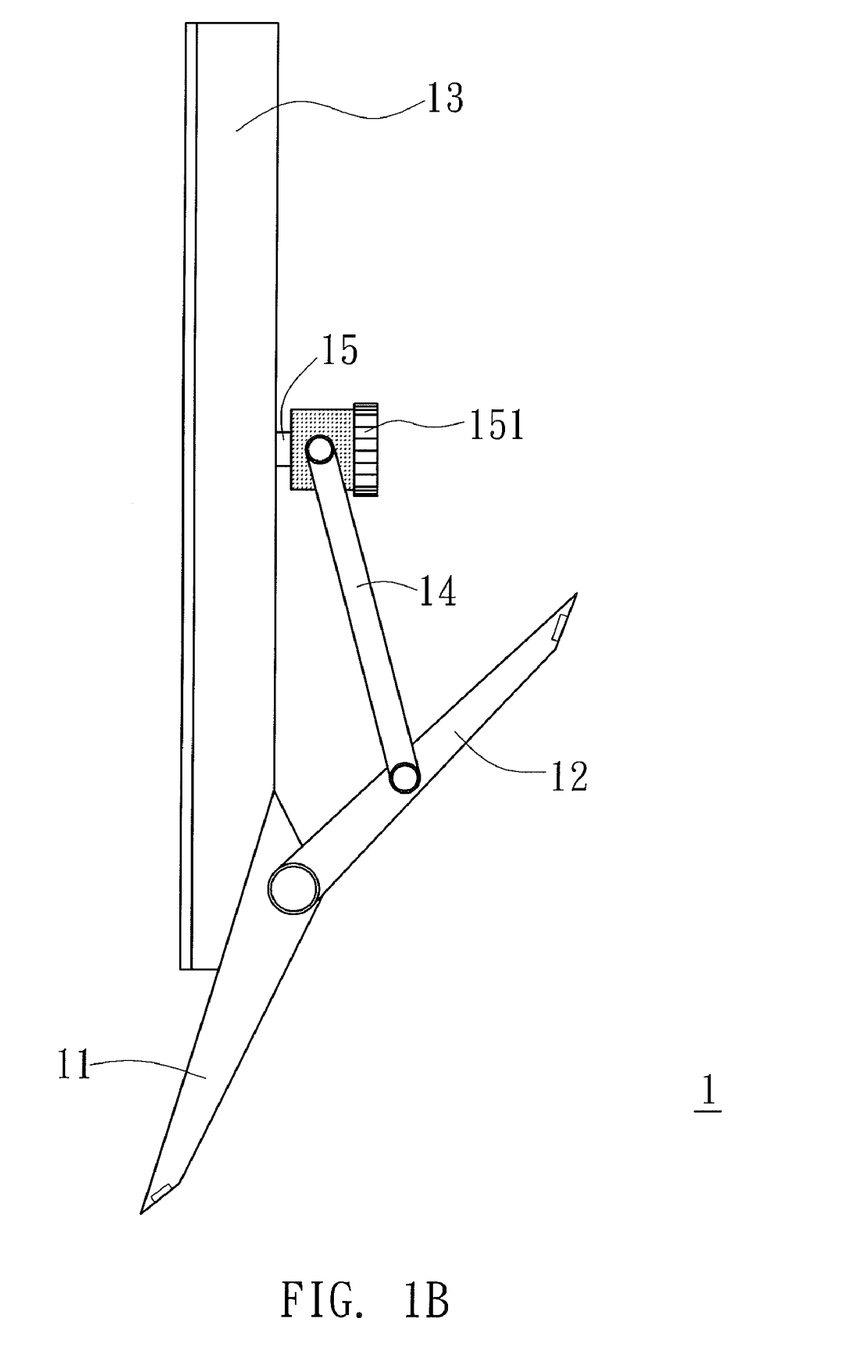
FIG. 1B is a diagram of a monitor with a base structure when the second stand is adjusted.
Figure 2:
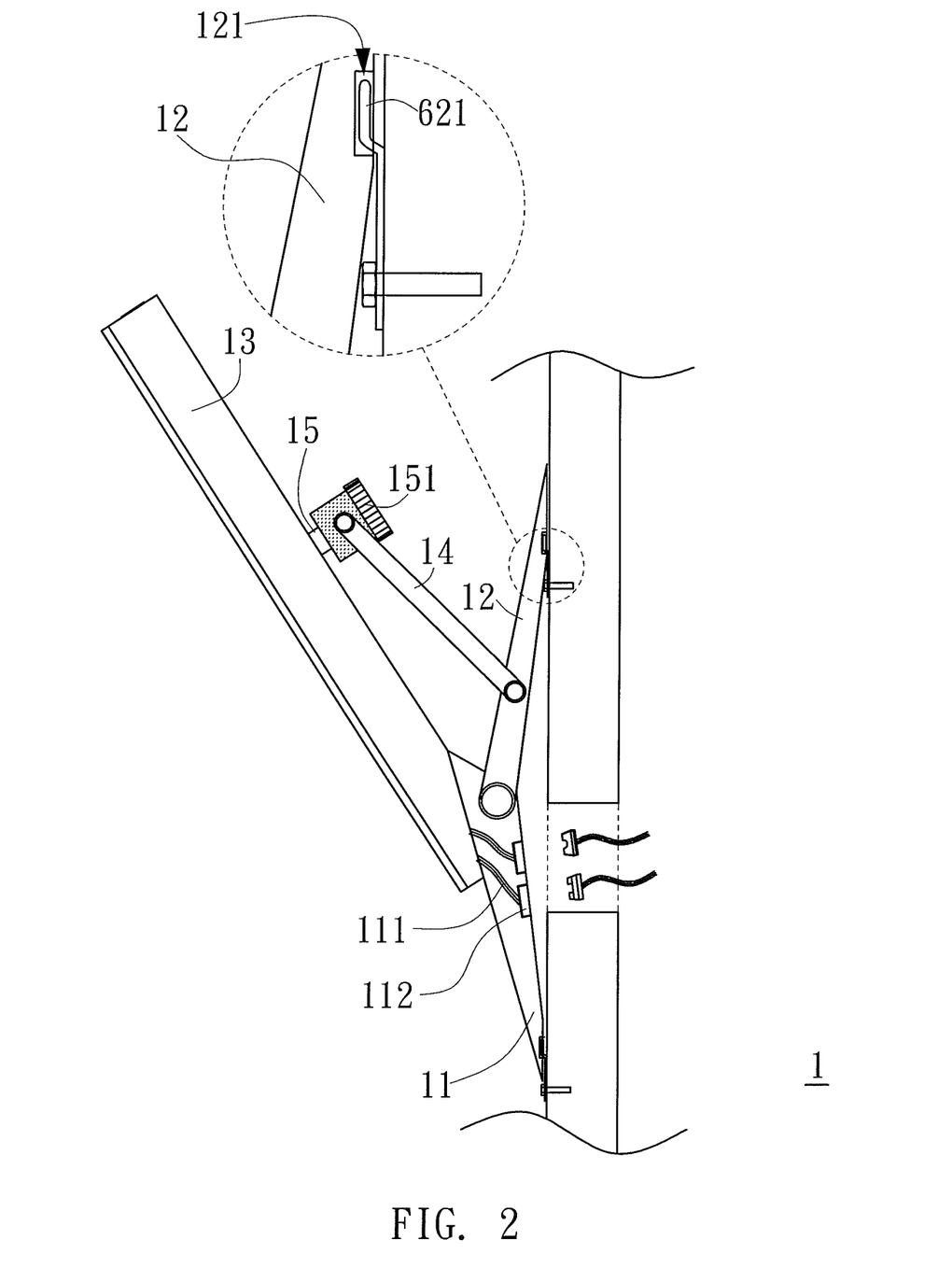
FIG. 2 is a diagram of a monitor with a base structure when the monitor is hung on the wall.

Please refer to FIG. 1A and FIG. 1B simultaneously, FIG. 1B is a diagram of a monitor 1 with a base structure when the second stand 12 is adjusted. In order to hang the monitor 1 on the wall, the slide portion 15 is moved upward. Then, the second stand 12 rotates counterclockwise so that the angle between the second stand 12 and the first stand 11 is increased, and, thus, the monitor 1 can be hung on the wall. The diagram showing that the monitor 1 is hung on the wall is depicted in FIG. 2. In FIG. 2, the monitor 1 is hung on the wall by hitching the groove 121 of the second stand 12 to the hanger 621 of the wall. Besides, the signal cables or power cords at the rear side of the first stand 11 may enter the wall directly so that it is impossible for the user to see those messy cables from the front of the monitor 1. Therefore, the base structure of present invention not only can support the monitor 1, but also is adapted to place the monitor 1 on the desk or to hang the monitor 1 on the wall, without disassembling or installing any component of the monitor 1.

Figure 1C:
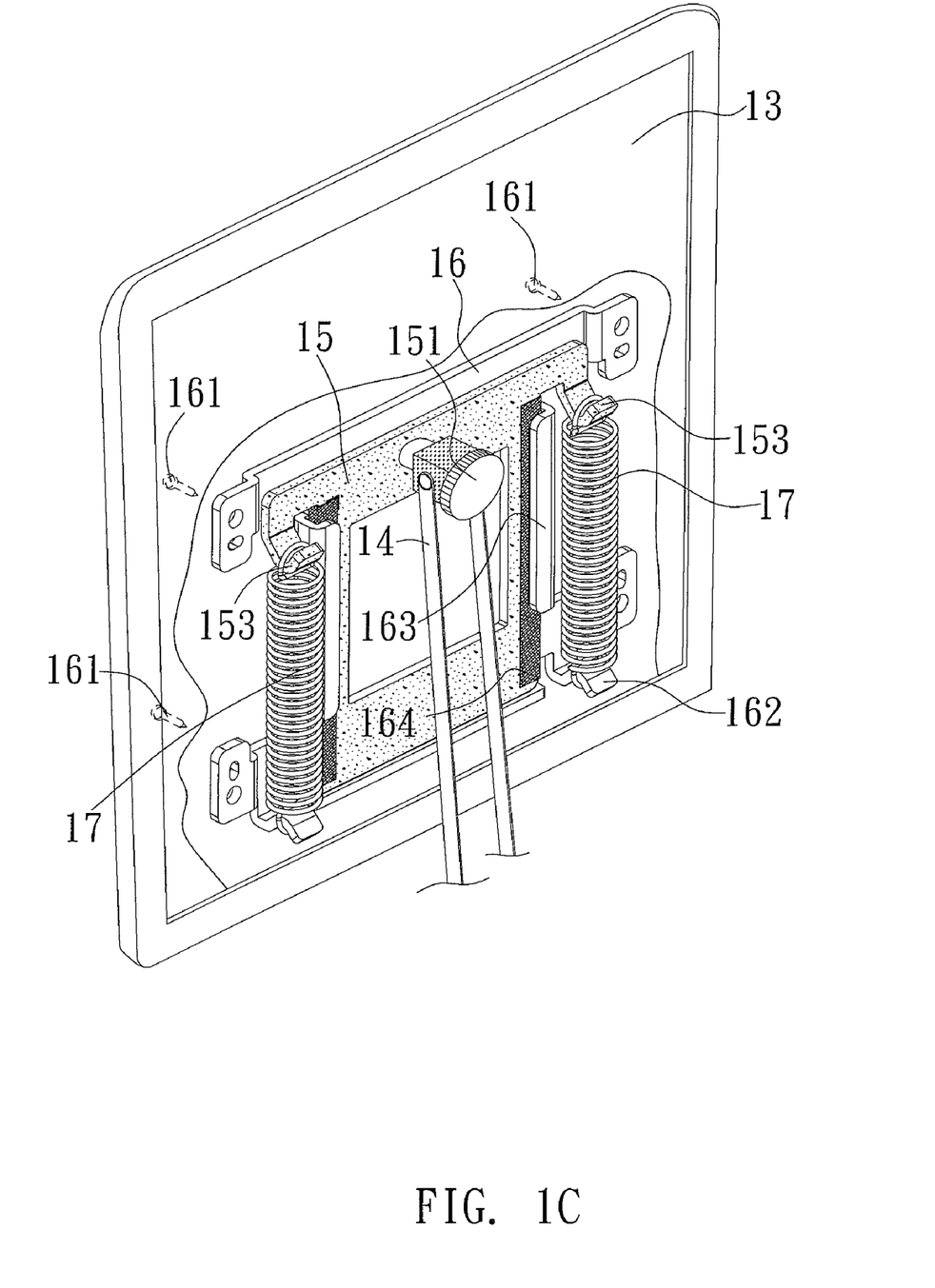
FIG. 1C is a perspective diagram of a monitor with a base structure when the monitor is placed on the desk.

Afterward, in order to easily adjust the movement of the slide portion 15, it still needs some arrangement inside the monitor 1. FIG. 1C is a perspective diagram of a monitor 1 with a base structure when the monitor 1 is placed on the desk. As shown in FIG. 1C in accordance with FIG. 1A, the slide portion 15 is moved to the bottom of the monitor 1, and the configuration inside the monitor 1 is depicted in FIG. 1C, when the monitor 1 is placed on the desk as shown in FIG. 1A. The rear casing 13 inside the monitor 1 further contains a fixed portion 16 and two springs 17. The fixed portion 16 is firmly disposed and fixed by fastening several screws 161 to the rear casing 13. The fixed portion 16 includes two slide rails 163 and two hook-shaped first spring connections 162. The slide portion 15 is disposed adjacent to the fixed portion 16. The push bar 14 and the slide portion 15 can be moved up and down repeatedly by the two slide rails 163. The slide portion 15 further includes two hook-shaped second spring connections 153. Two ends of the springs 17 are hitched to the hook-shaped first spring connections 162 and second spring connections 153, so that the spring 17 can be linked to the first spring connections 162 and the second spring connections 153 respectively with its two ends. Thus, when the user takes up the monitor 1, two springs 17 may contract because of its elasticity. Thus, the first spring connections 162 and the second spring connections 153 will come closer, and the slide portion 15 will be pulled downward by the spring 17, so as to make the push bar 14 move to the bottom of the monitor 1 and decrease the angle between the first stand 11 and the second stand 12. In this manner, the monitor 1 can be adapted to be placed on the desk.

Figure 1D:
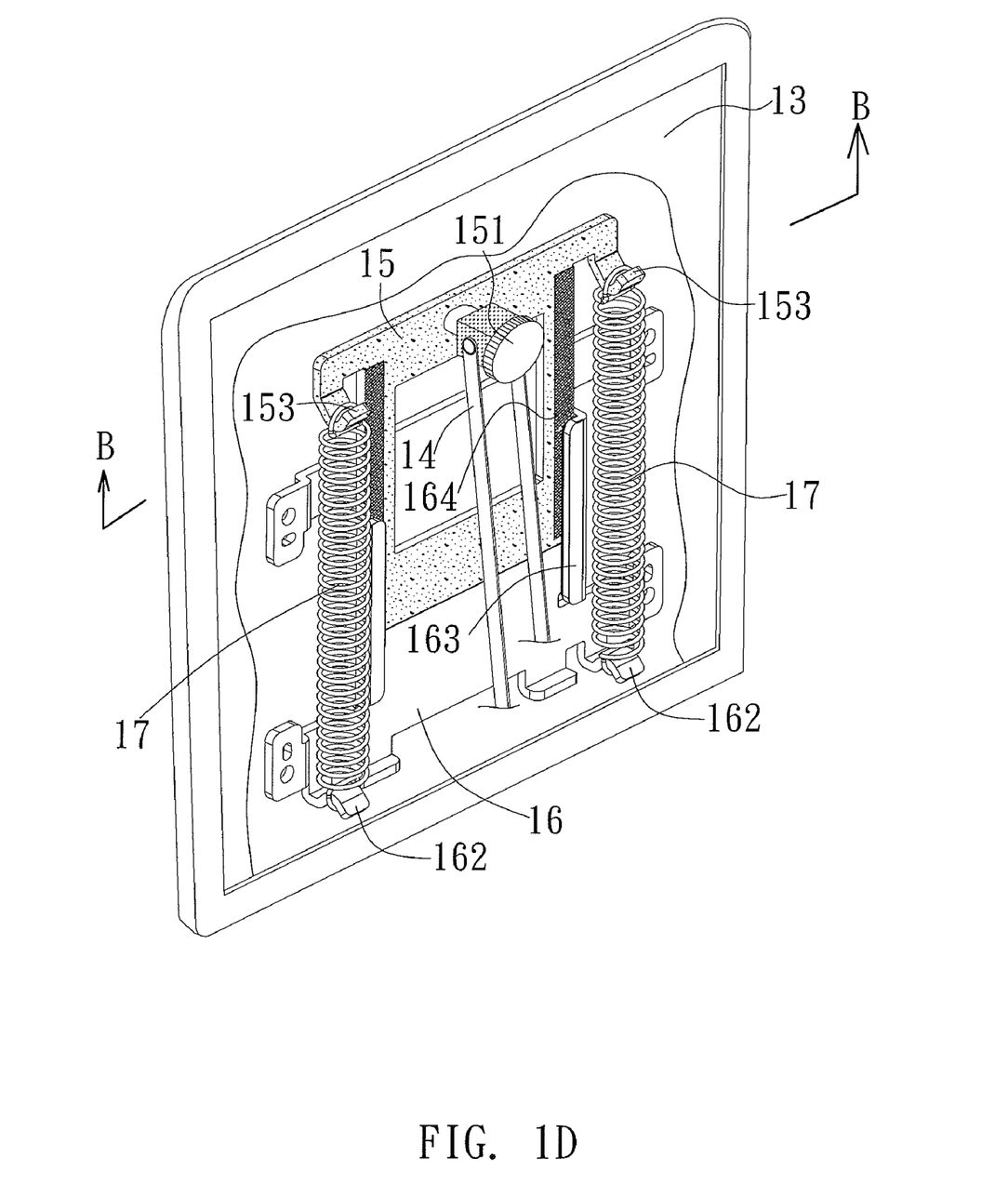
FIG. 1D is a perspective diagram of a monitor with a base structure when the second stand is adjusted.

Afterward, please refer to FIG. 1C and FIG. 1D simultaneously. FIG. 1D is a perspective diagram of a monitor 1 with a base structure when the second stand 12 is adjusted. In FIG. 1D, when the slide portion 15 is moved upward, the movement of the slide portion 15 will make the second spring connections 153 stretch two springs 17. In the meantime, as shown in FIG. 1B and FIG. 2, the push bar 14 is moved to a higher position of the monitor 1, and, then, the angle between the first stand 11 and the second stand 12 is increased to the maximum. In this manner, the monitor 1 can be adapted to hang on the wall. Therefore, the base structure of present invention utilizes the repeatable movement of the slide portion 15 to maximize the travelling distance of the push bar 14 in a vertical direction, so as to largely change the expanding angle of the second stand 12. In this manner, the monitor 1 can be adjusted to be placed on the desk or hang on the wall. Besides, because of the flat and thin characters characteristics that the fixed portion 16, the slide portion 15 and the spring 17 may have, they would be less space-consuming, so that the monitor 1 can achieve thinness as much as possible.

In addition, frictional resistance exists between the slide portion 15 and the slide rail 163. Thus, the movement of the slide portion 15 will not be smooth. In order to conquer the problem to smooth the movement of the slide portion 15 without too much resistance, those skilled in the art may further dispose a lubricating layer 164 at the contact area between the slide rail 163 and the slide portion 15. The lubricating layer 164 may be Teflon, a non-woven fabric, or a wear-resisting and low-friction product. In this manner, the friction between the slide portion 15 and the slide rail 163 will be deceased, and, then, the movement of the slide portion 15 will be smoother.

Figure 3:
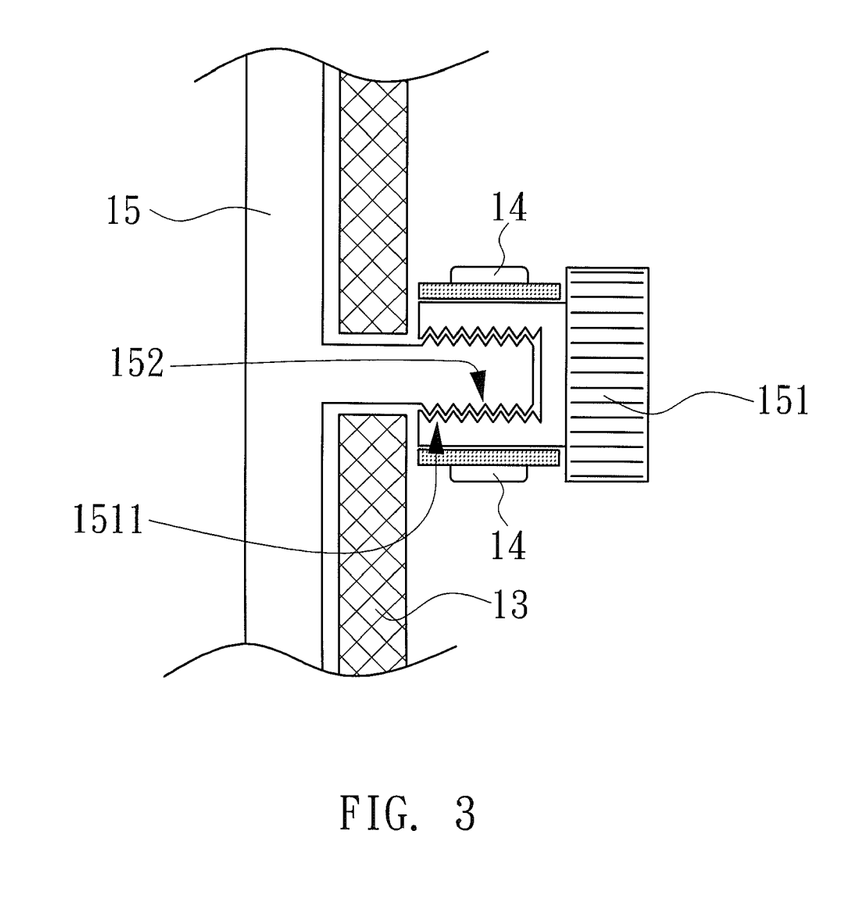
FIG. 3 is a cross-sectional diagram of B-B section of FIG. 1D.

Moreover, in order to fix the expanding angle of the second stand 12, those skilled in the art may dispose some specific fixing provisions. As shown in FIG. 3, the slide portion 15 further includes a thumb screw 151. The thumb screw 151 is matched to an external thread 152 of the slide portion 15 by an internal thread 1511, so that the friction between the thumb screw 151 and the rear casing 13 may be increase or decrease when the thumb screw 151 is fastened or loosened. In this manner, the slide portion 15 can be fastened and stopped from moving up and down on the rear casing 13.

Figure 4:
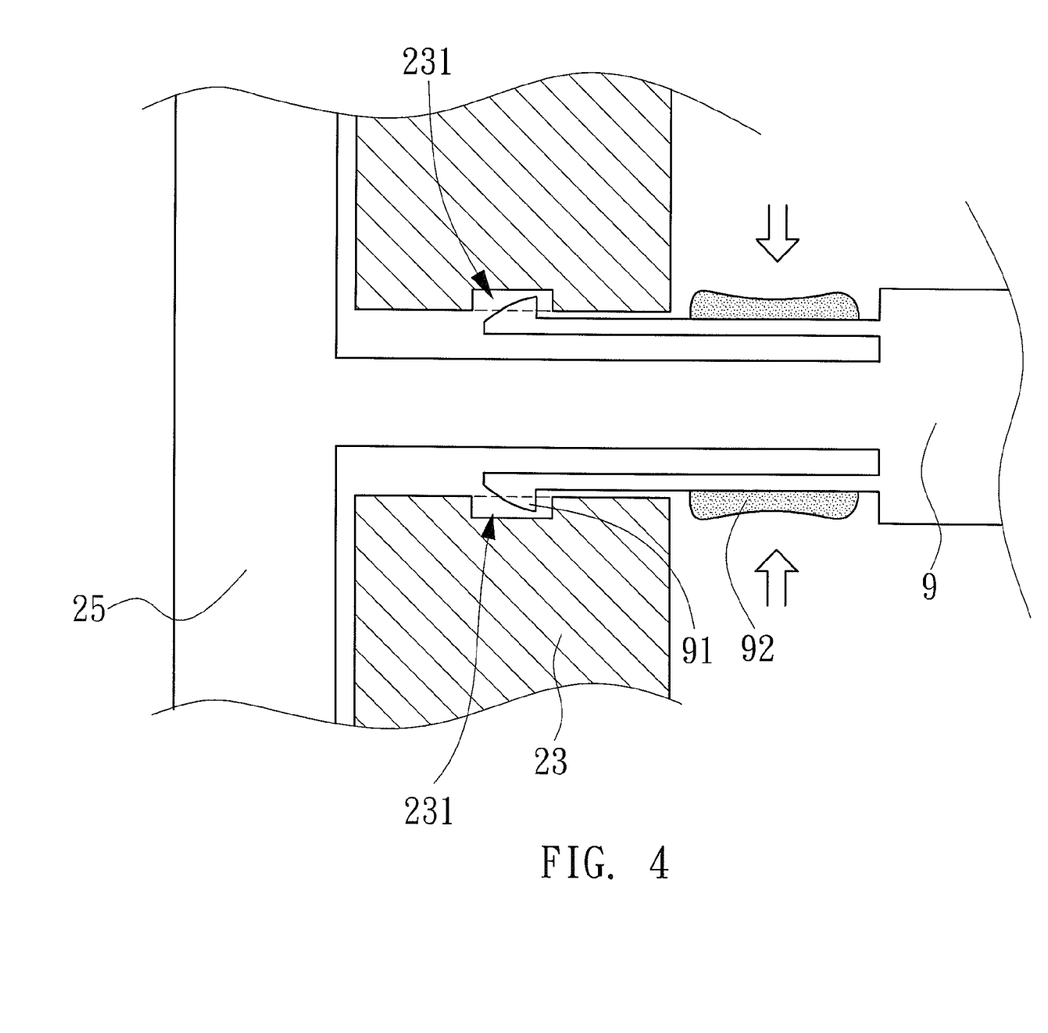
FIG. 4 is a cross-sectional diagram of a locking assembly and a rear casing.

However, those skilled in the art may replace the thumb screw 151 by a locking assembly As shown in FIG. 4, the slide portion 25 includes a locking assembly 9. The locking assembly 9 contains two hooks 91 disposed outside the locking assembly 9 and adjacent to the rear casing 23. The rear casing 23 contains two notches 231 corresponding to the hooks 91. The locking assembly 9 further includes two grips 92 attaching to the hooks 91. When the hooks 91 are stuck by the notches 231, the slide portion 25 can not be moved. When the grips 92 are pressed, the hooks 91 can be released and freed from the notches 231. In this manner, the locking assembly 9 may be utilized to fix or release the slide portion 25 so as to adjust the expanding angle of the second stand 12 in the monitor 1 depicted in FIG. 2.

Figure 5:
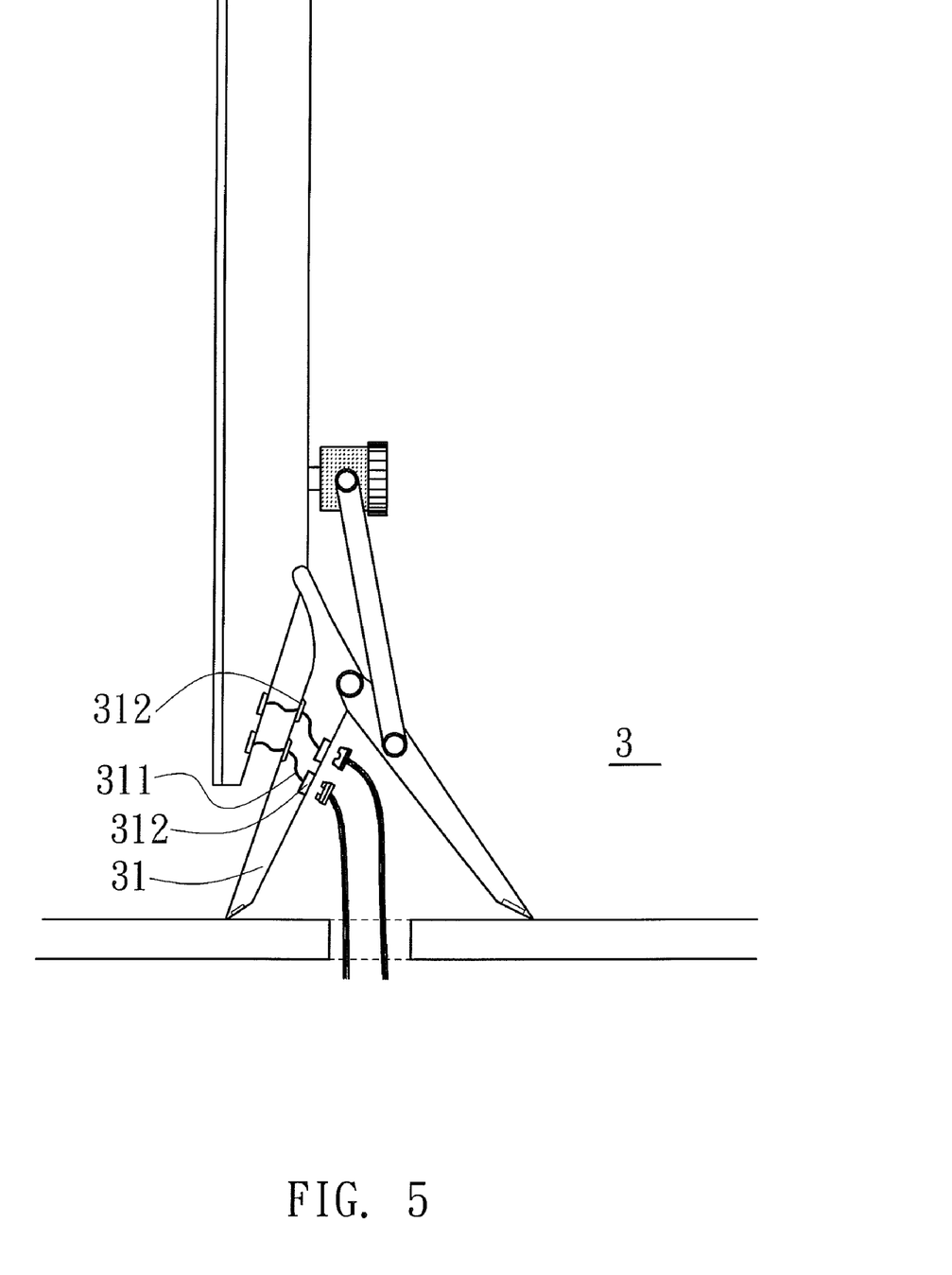
FIG. 5 is a diagram of another embodiment of a rear casing and a first stand.

FIG. 5 is a diagram of another embodiment of the rear casing 23 and the first stand 31. As shown in FIG. 5, in the monitor 3, the first stand 31 contains a plurality of wires 311 passing through the front and rear sides of the first stand 31 and a plurality of sockets 312 correspondingly disposed at the front side and the rear side of the first stand 31. In this case, it may achieve the same function as described previously.

Summarily, the base structure for a monitor can improve the inconvenience of the prior art by incorporating the supporting base structure and the suspending stand. Thus, there is no need to additionally purchase a suspending stand, and resources as well as time of disassembling the conventional base and installing the purchased stand will be saved. In this reason, the present invention may have a tremendous potential in the market.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art.

We claim:

1. A base structure adapted to place a monitor on a desk and to hang the monitor on a wall, the base structure comprising:
   a rear casing;
   a fixed portion firmly disposed on said rear casing, with said fixed portion including at least one first spring connection and at least one slide rail;
   a slide portion repeatedly movable by said at least one slide rail and including at least one second spring connection;
   at least one spring linking said at least one first spring connection and said at least one second spring connection with two ends;
   a push bar pivotally linked to said slide portion with one end of said push bar and repeatedly movable on said rear casing along with said slide portion;
   a first stand firmly disposed on said rear casing, with the first stand containing at least one groove;
   a second stand pivotally linked to said first stand with one end of said second stand, with another end of said push bar pivotally linked to another end of said second stand, with said second stand further containing at least one groove;
   wherein said slide portion is moveable up and down on the at least one slide rail and with said spring stretching with movement of the slide portion, wherein an angle between said first stand and said second stand is adjustable between a desk position and a wall position, with the first and second stands supporting the monitor on the desk in the desk position;
   first and second hangers adapted to be hung on the wall, with the at least one groove of the first stand and the at least one groove of the second stand receiving the first and second hangers in the wall position to hang the monitor on the wall; and
   a locking assembly moveable relative to the slide portion, with the rear casing being intermediate the locking assembly and the slide portion; and a grip located on the locking assembly and intermediate the locking assembly and the rear casing, with the one end of the push bar pivotally linked to the grip, with the locking mechanism fastening said slide portion and stopping said slide portion from moving.

2. The base structure according to claim 1, wherein a lubricating layer is disposed at a contact area between said at least one slide rail and said slide portion.

3. The base structure according to claim 2, wherein said lubricating layer is one material selected from Teflon, nonwoven fabric, or wear-resisting and low-friction product.

4. The base structure according to claim 1, wherein said locking assembly is a thumb screw in order to fasten said slide portion and stop said slide portion from moving.

5. The base structure according to claim 4, wherein said thumb screw is matched to an external thread of said slide portion by an internal thread so that friction between said thumb screw and said rear casing is increased or decreased by fastening or loosing said thumb screw.

6. The base structure according to claim 1, wherein said locking assembly contains at least one hook disposed adjacent to said rear casing, and wherein said rear casing contains at least one notch corresponding to said at least one hook so that said slide portion stops moving when said hook is stuck by said notch.

7. The base structure according to claim 6, wherein said grip is attached to the at least one hook and is releasable so as to free said hook from said notch.

8. The base structure according to claim 1, wherein said first stand contains a plurality of wires passing through front and rear sides of said first stand and a plurality of sockets correspondingly disposed at the front side and the rear side of said first stand.

9. The base structure according to claim 1, wherein said fixed portion is disposed on said rear casing by screws.

10. The base structure according to claim 1, wherein said at least one first spring connection or said second spring connection is hook-shaped so as to make either of the two ends of said spring hitch to said at least one first spring connection or said at least one second spring connection.

11. The base structure according to claim 1, wherein said at least one spring comprises two springs, wherein the two ends of each spring are linked to one first spring connection and one second spring connection respectively.

12. The base structure according to claim 1, wherein said first stand and said rear casing are one-body.

13. The base structure according to claim 1, wherein said first stand contains a plurality of wires and a plurality of sockets correspondingly disposed at a rear side of said first stand.

14. The base structure according to claim 13, wherein said plurality of wires are disposed inside said first stand without being exposed.

15. A base structure adapted to place a monitor on a desk and to hang the monitor on a wall, the base structure comprising:
   a rear casing;
   a fixed portion firmly disposed on said rear casing, with said fixed portion including at least one first spring connection and at least one slide rail;
   a slide portion repeatedly movable by said at least one slide rail and including at least one second spring connection;
   at least one spring linking said at least one first spring connection and said at least one second spring connection with two ends;
   a push bar pivotally linked to said slide portion with one end of said push bar and repeatedly movable on said rear casing along with said slide portion;
   a first stand firmly disposed on said rear casing;

a second stand pivotally linked to said first stand with one end of said second stand, with another end of said push bar pivotally linked to another end of said second stand;

a locking assembly moveable relative to the slide portion, with the rear casing being intermediate the locking assembly and the slide portion; and a grip located on the locking assembly and intermediate the locking assembly and the rear casing, with the one end of the push bar pivotally linked to the grip, with the locking mechanism fastening said slide portion and stopping said slide portion from moving, wherein said slide portion is moveable up and down on the at least one slide rail and with said spring stretching with movement of the slide portion, wherein an angle between said first stand and said second stand is adjustable.

16. The base structure according to claim 15, wherein said locking assembly is a thumb screw in order to fasten said slide portion and stop said slide portion from moving.

17. The base structure according to claim 16, wherein said thumb screw is matched to an external thread of said slide portion by an internal thread so that friction between said thumb screw and said rear casing is increased or decreased by fastening or loosing said thumb screw.

18. The base structure according to claim 15, wherein said locking assembly contains at least one hook disposed adjacent to said rear casing, and wherein said rear casing contains at least one notch corresponding to said at least one hook so that said slide portion stops moving when said hook is stuck by said notch.

19. The base structure according to claim 18, wherein said grip is attached to the at least one hook and is releasable so as to free said hook from said notch.

\* \* \* \* \*